United States Patent [19]
Mays et al.

[11] 3,849,170
[45] Nov. 19, 1974

[54] COATING COMPOSITION FOR OPTICAL PROJECTION

[75] Inventors: John D. Mays, Dayton; Jack L. McClannan, Pittsburgh, both of Ohio

[73] Assignee: The Standard Register Company, Dayton, Ohio

[22] Filed: Jan. 9, 1973

[21] Appl. No.: 322,159

Related U.S. Application Data

[63] Continuation-in-part of Ser. No. 130,205, April 1, 1971, abandoned.

[52] U.S. Cl. ............... 117/36.3, 117/36.8, 117/36.9
[51] Int. Cl. ............................................. B41c 1/06
[58] Field of Search ....... 117/36.1, 36.3, 36.4, 36.8, 117/36.9

[56] References Cited
UNITED STATES PATENTS

| | | | |
|---|---|---|---|
| 3,036,924 | 5/1962 | Newman | 117/36.1 |
| 3,151,550 | 10/1964 | Newman | 117/36.1 |
| 3,249,458 | 5/1966 | Cornell et al. | 117/36.9 |
| 3,635,747 | 1/1972 | Skees et al. | 117/36.3 |

OTHER PUBLICATIONS
IBM Tech. Disc. Bull., Vol. 5, No. 4, September 1962.

*Primary Examiner*—Thomas J. Herbert, Jr.
*Attorney, Agent, or Firm*—Jacox & Meckstroth

[57] ABSTRACT

Record sheet material consisting of two sheets, a top sheet which is a self-contained, pressure-sensitive carbonless-carbon-paper sheet and an under sheet which has on its under-surface a pressure-responsive, transferable, adhesive coating, consisting of a natural or synthetic wax and a tack-regulator. The two sheets are mated, when in use, with the upper, uncoated surface of the undersheet facing the self-contained top sheet. When the record sheet material is impressioned as, for example, with a stylus, typeface, or the like, with the wax surface of the undersheet on a transparent platen surface of an overhead projector prism, a permanent copy of the pressure image appears on the selfcontained top sheet, and a corresponding wax image is adhesively transferred to the transparent platen surface for projection to an overhead screen.

6 Claims, 2 Drawing Figures

INVENTORS
JOHN D. MAYS
JACK L. McCLANNAN
BY William R Jacox
ATTORNEY

1

COATING COMPOSITION FOR OPTICAL PROJECTION

RELATED APPLICATION

This application is a continuation-in-part of patent application Ser. No. 130,205, filed Apr. 1, 1971, now abandoned.

BACKGROUND OF THE INVENTION

There is provided by this invention pressure-responsive record sheet material which has a pressure-sensitive self-imaging top surface and a wax-coated bottom surface, containing a tack-regulator. The wax coat is a pressure-sensitive adhesive transfer layer. The record sheet material is particularly designed for use in making a permanent record by pressure writing on said top surface and simultaneously making a wax image on an overhead projector platen for immediate optical projection on a screen, such as used in bowling score projection systems.

An object of this invention is to provide an inexpensive record material for the stated use, which object involves a record material which allows the use of less expensive coating materials and coating methods not heretofore usable in such record materials.

Another object of this invention is to provide a record sheet material which gives a well-defined image for optical projection.

A further object of this invention is to provide a record sheet material having a bottom transfer coat which is also adhesive so that the record sheet material, when in use, will adhere to the supporting platen when the first pressure mark is made, so that the record sheet material will not slip about on the platen and so that the subsequent pressure images made on the top surface will appear as a transfer image on the platen in the proper relation to the first mark.

The objects of this invention have been realized by providing a record sheet material consisting of two paper sheets mated back-to-back with a pressure-sensitive self-imaging top surface on a first sheet and a bottom surface on the under-side of an undersheet which is a wax coat including a tack-regulator. Said first sheet is a carbonless-carbon-paper sheet of the type commonly sold as self-contained "NCR-Paper" and "Action" paper. Said undersheet has a coating consisting largely of a wax together with materials which alter the tackiness of the wax. If the wax is a very hard wax a tackifier is added thereto to make the coat properly tacky. Softer waxes may be made less tacky by the addition of tack-decreasing agents.

DETAILED DESCRIPTION OF THE PREFERRED EMBODIMENTS

Figure 1:
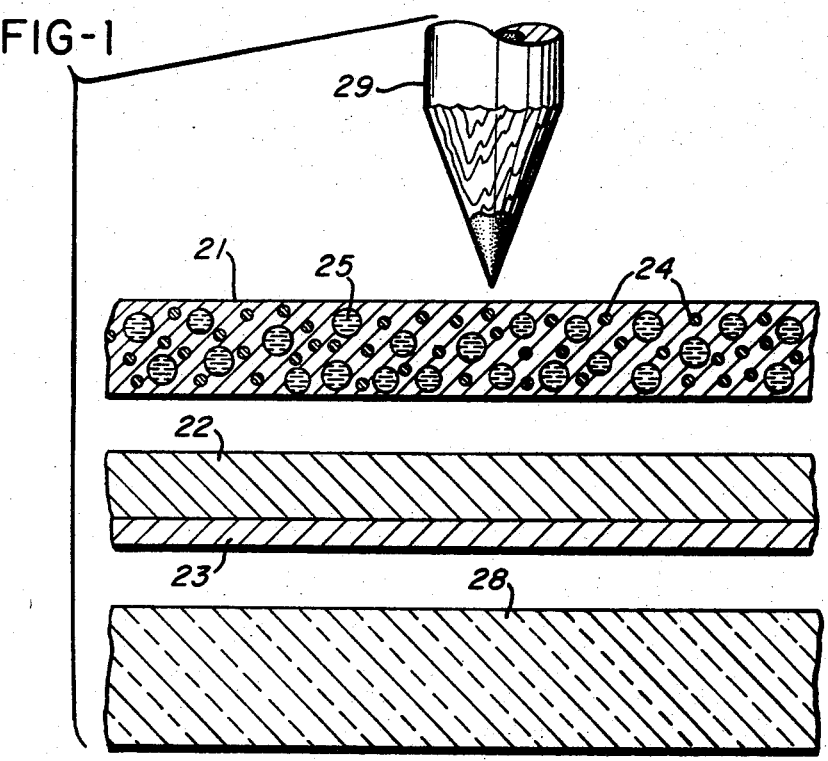
FIG. 1 is a cross-sectional view of the preferred record sheet material of this invention.

The top sheet 21 is a pressure-responsive, self-imaging sheet, comprising pressure-rupturable capsules 25, containing liquid droplets of colorless, chromogenic materials which are released from isolating encapsulation when subjected to writing or printing pressure brought into reaction contact with solid co-reactant particles 24. Said reaction produces a distinctively colored visible mark in the shape and position of the inscribed pressure pattern. A second or undersheet 22, attached to the top sheet, is provided as a cushioning layer between the light-transmitting platen 28 and an inscribing member 29. The sheet 22 bears a tack-regulated natural or synthetic wax coat 23 which transmits wax to the platen surface in response to imaging pressures and also causes the entire record sheet unit to adhere to the platen 28 to eliminate slippage of the unit during writing use. The cushioning effect of sheet 22 broadens the transmitted pressure front from the inscribing member so as to widen the transmitted wax image to give a broad, readily-projected wax image.

Figure 2:
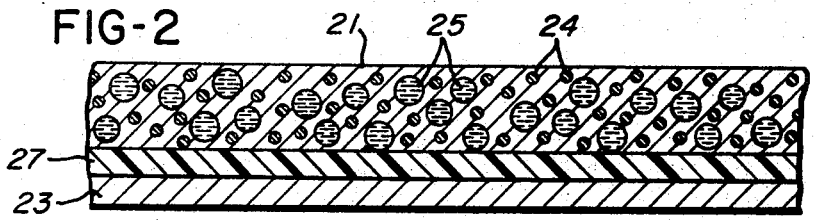
FIG. 2 is a cross-sectional view of a single sheet modification of this invention.

FIG. 2 shows a single sheet modification of this invention which makes use of the same principles and materials but may be more expensive to produce than the two-part record sheet material unit of FIG. 1. In FIG. 2, the sheet 21, comprising isolated liquid chromogenic droplets 25 and color-producing co-reactant particles 24 as in FIG. 1, is provided with a polymeric film layer 27, such as polyethylene, which serves as a cushion, a support for the wax coat 23, and a wax-impermeable layer which keeps the wax from penetrating into sheet 21 during the wax coating operation. The film layer 27 also serves to produce image spread. The film layer 27 also serves to protect the platen from print or writing elements.

The proper operation of the record sheet material of this invention is greatly dependent on the formulation of the wax transfer-adhesive coat which must not be so tacky as to cause blocking of stacks or rolls of record sheet material units but must be tacky enough to stick to the glass surface of the projector platen, without coating offset, in response to the writing pressure. In common practice, a projector light warms the platen to temperatures in the range of 70° to 120° Fahrenheit. The wax formulations of this invention have been designed to operate at these temperatures and to meet the requirements set out above. The material proportions set out herein are surprisingly narrow in range such that small variations in formulation proportions cause the wax coat to operate unsatisfactorily. Following are three formulation examples which typify the principles and practice of this invention:

| Formulation A - | 85% polyethylene |
| | 15% paraffin |
| Formulation B - | 97% microcrystalline wax |
| | 3% polybutene |
| Formulation C - | 95% polyethylene |
| | 5% poly(ethylene-vinyl acetate) |

The polyethylene used in Formulations A and C is a low molecular weight polyethylene having a molecular weight range of about 800 to about 1200, preferably about 900 to about 1100, and a hardness value in the range of about 75 to about 120. Useful polyethylene of this type is sold under the designation AC-1702 by The Allied Chemical Company Plastics Division, Morristown, New Jersey. Polyethylene having these specifications is too tacky to operate satisfactorily without a tack-decreasing agent. In Formulation A, the tack is decreased by the addition of paraffin and, in Formulation C, by the addition of poly(ethylene-vinyl acetate). The paraffin has a melting point of about 155° Fahrenheit. The poly(ethylene-vinyl acetate) melts in the range of about 128° to about 138° Fahrenheit and is available from the E. I. duPont deNemours Co. of Wilmington, Delaware as Elvax 210. The microcrystalline wax used here has a melting point of about 143° Fahrenheit and is of the type sold by Bareco Division of the Petrolite Corporation, Oak Brook, Illinois under the trademark Ultraflex Amber. The polybutene is identified by the trademark Indopol Polybutene H-1500, sold by Amoco Corporation, 130 East Randolph Drive, Chicago, Illinois, and having a specific gravity of 0.900–0.930 and a viscosity at 210° Fahrenheit of 2900–3650 centistokes. The polybutene is used here as a tackifying agent for the microcrystalline wax which is too hard to perform satisfactorily as a wax coat for the use of this invention.

The proportion of materials in Formulation C may be varied slightly, but polyethylene should always be present to the extent of about 94% to 99% with the ethylene vinyl acetate being in the range of about 1% to 6%.

In Formulation A, polyethylene may be in the range of 80% to 90% with the paraffin being present in the range of 10% to 20% and still perform satisfactorily.

Formulation B can be varied only to the extent of plus or minus 1%. Thus, the range for an acceptable micro-crystalline wax coat is a coat comprising 96% to 98% microcrystalline wax and 2% to 4% polybutene.

Infusible extenders and opacifiers, such as mineral pigment particles, may be added to the above formulations, although such practice is not preferred, so long as the ratio of wax to tack regulator is maintained within the ranges set out above.

An alternative formulation, Formulation D, may be used. Formulation D makes use of carnauba wax and paraffin, which combination is made more tacky by the addition of carbon oil and petrolatum. When the combination so-far set out for Formulation D is further modified by the addition of hydro-fine particles of a wettable mineral pigment such as fumed silica filler particles to increase the viscosity of the formulation at elevated temperatures such as are encountered in a hot-melt application to the undersheet, it is the preferred formulation.

Formulation D -  18.2% carnauba wax
                 7.4% paraffin
                 46.5% carbon oil
                 18.0% petrolatum
                 9.8% fumed silica filler
                 0.1% Alkali Blue The proportions of Formulation D may be varied over a somewhat wider range than those previously set forth for Formulation A–C. Variations that fall within the following ranges have been found to be operable: carnauba wax (15–25%), paraffin (5–15%), carbon oil (40–50%), petrolatum (15–20%), fumed silica filler (7.5–15%), Alkali Blue (0–0.25%).

The addition of oil-soluble dyes, such as Alkali Blue is purely a matter of color preference, and may be omitted altogether. The addition of oil-soluble dyes should be kept to a minimum, however, in as much as the addition of dark colors to the formulation, increases the heat absorption of the formulation. It has been found that amounts of Alkali Blue much above about 0.25% of the total formulation give a mixture that is too tacky in use, due to heat absorption from the light source in the overhead projector.

The petrolatum used herein should have a melting range between about 145° and 170° Fahrenheit. The particular petrolatum preferred herein showed a melting range of 156'161° Fahrenheit. The carbon oil used herein had a flash point of about 325° Fahrenheit. The paraffin used herein (in both Formulations A and D) preferably melt about 155° Fahrenheit, but may melt as low as about 135° Fahrenheit or as high as about 175° Fahrenheit.

The wax coatings of this invention are preferably applied to the undersheet by means of hot-melt application, a method which has considerable economic advantage over wet coating operations that require drying and/or setting steps. Hot-melt coating operations are well known but have not previously been used in this art. The wax coats of this invention are applied to the paper substrate sheet at a coating weight of 3.0 to 3.5 lbs. per ream (20 × 30 × 500).

Although the preferred embodiments of the composition have been described, it will be understood that within the purview of this invention, changes may be made therein, which retain the composition of this invention as defined by the appended claims.

The invention having thus been described, the following is claimed:

1. Record sheet material comprising substrate sheet material having a pressure-sensitive, self-imaging top surface region and a bottom surface region, wherein the bottom surface region is a transfer-adhesive composition comprising a wax and a tack-regulator, wherein the top surface region and the bottom surface region are separated by a cushioning layer, wherein the wax is polyethylene having a molecular weight of about 800 to about 1200 and the tack-regulator is a tack-decreasing agent selected from the group consisting of 10% to 20%, by weight of the wax and tack-regulator combination, of paraffin having a melting point of about 135° to 175° Fahrenheit and 1% to 6%, by weight of the wax and tack-regulator combination, of poly-(ethylene-vinyl acetate) having a melting point of about 128° to about 138° Fahrenheit.

2. Record sheet material comprising substrate sheet material having a pressure-sensitive, self-imaging top surface region and a bottom surface region, wherein the bottom surface region is a transfer-adhesive composition comprising a wax and a tack-regulator, wherein the top surface region and the bottom surface region are separated by a cushioning layer, wherein the wax and tack-regulator combination essentially consists of 96% to 98% by weight of microcrystalline wax and 2% to 4% by weight of polybutene.

3. The record sheet material of claim 2 wherein the microcrystalline wax has a melting point in the range of about 143° Fahrenheit to about 150° Fahrenheit, and the polybutene has a specific gravity of 0.900 to 0.930 and a viscosity at 210° Fahrenheit of 2900–3650 centistokes.

4. Record sheet material comprising substrate sheet material having a pressure-sensitive, self-imaging top surface region and a bottom surface region, wherein the bottom surface region is a transfer-adhesive composition comprising a wax and a tack-regulator, wherein the top surface region and the bottom surface region are separated by a cushioning layer, wherein the wax and tack-regulator combination essentially consists of 15% to 25% carnauba wax, 5% to 15% paraffin, 40% to 50% carbon oil, 15% to 20% petrolatum, 7½% to 15% microfine wettable mineral pigment particles.

5. The record sheet material of claim 4 wherein the mineral pigment particles are fumed silica filler particles.

6. The record sheet material of claim 4 wherein the self-imaging top surface region is part of a first sheet and the transfer-adhesive wax coating is on the undersurface of an undersheet which is mated back-to-back with the first sheet.

* * * * *